United States Patent
Levijoki et al.

(10) Patent No.: US 8,205,440 B2
(45) Date of Patent: Jun. 26, 2012

(54) INTRUSIVE SCR EFFICENCY TESTING SYSTEMS AND METHODS FOR VEHICLES WITH LOW TEMPERATURE EXHAUST GAS

(75) Inventors: Stephen Paul Levijoki, Swartz Creek, MI (US); Shouxian Ren, Ypsilanti, MI (US)

(73) Assignee: GM Global Technology Operations LLC

( * ) Notice: Subject to any disclaimer, the term of this patent is extended or adjusted under 35 U.S.C. 154(b) by 333 days.

(21) Appl. No.: 12/606,512

(22) Filed: Oct. 27, 2009

(65) Prior Publication Data
US 2011/0061372 A1 Mar. 17, 2011

Related U.S. Application Data

(60) Provisional application No. 61/242,098, filed on Sep. 14, 2009.

(51) Int. Cl.
*F01N 3/00* (2006.01)
(52) U.S. Cl. .............................. 60/295; 60/277; 60/311
(58) Field of Classification Search .................... 60/277, 60/286, 295, 301
See application file for complete search history.

(56) References Cited

U.S. PATENT DOCUMENTS

| | | | | |
|---|---|---|---|---|
| 7,954,312 B2 * | 6/2011 | Gresens | ........................ | 60/286 |
| 2004/0206069 A1 * | 10/2004 | Tumati et al. | .................. | 60/285 |
| 2006/0130458 A1 * | 6/2006 | Solbrig | ........................ | 60/286 |
| 2007/0044458 A1 * | 3/2007 | Cheng | ........................ | 60/295 |
| 2007/0068139 A1 * | 3/2007 | Brown et al. | .................. | 60/277 |
| 2007/0277502 A1 * | 12/2007 | Duvinage et al. | ............... | 60/274 |
| 2008/0132405 A1 * | 6/2008 | Patchett et al. | ................. | 502/74 |
| 2008/0177457 A1 * | 7/2008 | Ishikawa et al. | ............. | 701/103 |
| 2008/0178575 A1 * | 7/2008 | Shaikh et al. | ................... | 60/274 |
| 2009/0293451 A1 * | 12/2009 | Kesse | ............................. | 60/274 |

FOREIGN PATENT DOCUMENTS

JP 2003314254 A * 11/2003

OTHER PUBLICATIONS

U.S. Appl. No. 12/606,483, filed Oct. 27, 2009, Stephen Paul Levijoki.

* cited by examiner

*Primary Examiner* — Thomas Denion
*Assistant Examiner* — Patrick Maines

(57) ABSTRACT

An exhaust diagnostic system includes an exhaust gas temperature management module that selectively increases a temperature of a selective catalytic reduction (SCR) catalyst to a predetermined testing temperature range using an intrusive exhaust gas temperature management approach. An SCR efficiency testing module estimates an efficiency of the SCR catalyst while the temperature is within the predetermined temperature range.

16 Claims, 4 Drawing Sheets

INTRUSIVE SCR EFFICENCY TESTING SYSTEMS AND METHODS FOR VEHICLES WITH LOW TEMPERATURE EXHAUST GAS

CROSS-REFERENCE TO RELATED APPLICATIONS

This application claims the benefit of U.S. Provisional Application No. 61/242,098, filed on Sep. 14, 2009. The disclosure of the above application is incorporated herein by reference in its entirety.

This application is related to U.S. application Ser. No. 12/606,483, filed on Oct. 27, 2009, which claims the benefit of U.S. Provisional Application No. 61/242,084, filed on Sep. 14, 2009. The disclosures of the above applications are incorporated herein by reference in their entirety.

FIELD

The present disclosure relates to exhaust diagnostic systems, and more particularly to exhaust diagnostic systems and methods that test the efficiency of a selective catalytic reduction (SCR) catalyst.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engine operation involves combustion that generates exhaust gas. During combustion, an air/fuel mixture is delivered through an intake valve to cylinders and is combusted in the cylinders. After combustion, a piston forces the exhaust gas in the cylinders through an exhaust valve and into an exhaust system. The exhaust gas may contain emissions such as oxides of nitrogen ($NO_x$) and carbon monoxide (CO).

Exhaust treatment systems monitor and treat the exhaust gas to meet emissions requirements. Treatment of exhaust gas may include the use of particulate filters, catalysts such as diesel oxidation catalysts (DOC) and/or selective catalytic reduction (SCR) catalysts, hydrocarbon injection and/or other devices. The efficiency of the SCR catalyst is usually monitored to ensure that emission levels remain acceptable during operation.

SUMMARY

An exhaust diagnostic system includes an exhaust gas temperature management module that selectively increases a temperature of a selective catalytic reduction (SCR) catalyst to a predetermined testing temperature range using intrusive exhaust gas temperature management. An SCR efficiency testing module estimates an efficiency of the SCR catalyst while the temperature is within the predetermined temperature range.

In other features, a vehicle includes the SCR catalyst. The SCR catalyst of the vehicle has a temperature in a first range when the vehicle is operated unloaded. The first temperature range is lower than and distinct from the predetermined testing temperature range.

In still other features, the exhaust gas temperature management module alters fueling to increase the temperature of the SCR catalyst.

In other features, the exhaust gas temperature management module alters at least one of fuel quantity, fuel injection timing, and post injection to increase the temperature of the SCR catalyst.

In other features, the SCR efficiency testing module includes a test enable module that selectively enables testing of the SCR efficiency when particulate filter regeneration is not being performed.

In other features, the SCR efficiency testing module includes a test enable module that selectively enables testing of the SCR efficiency when adaptation control of the SCR catalysts is not being performed.

In other features, an inlet temperature sensor senses an inlet temperature of the SCR catalyst. An outlet temperature sensor senses an outlet temperature of the SCR catalyst. The temperature of the SCR catalyst is calculated based on the inlet and outlet temperatures.

In still other features, the exhaust gas temperature management module includes a temperature calculating module that calculates the temperature of the SCR catalyst based on inlet and outlet temperatures of the SCR catalyst. An adjustment module alters an engine operating parameter to increase a temperature of the SCR catalyst.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
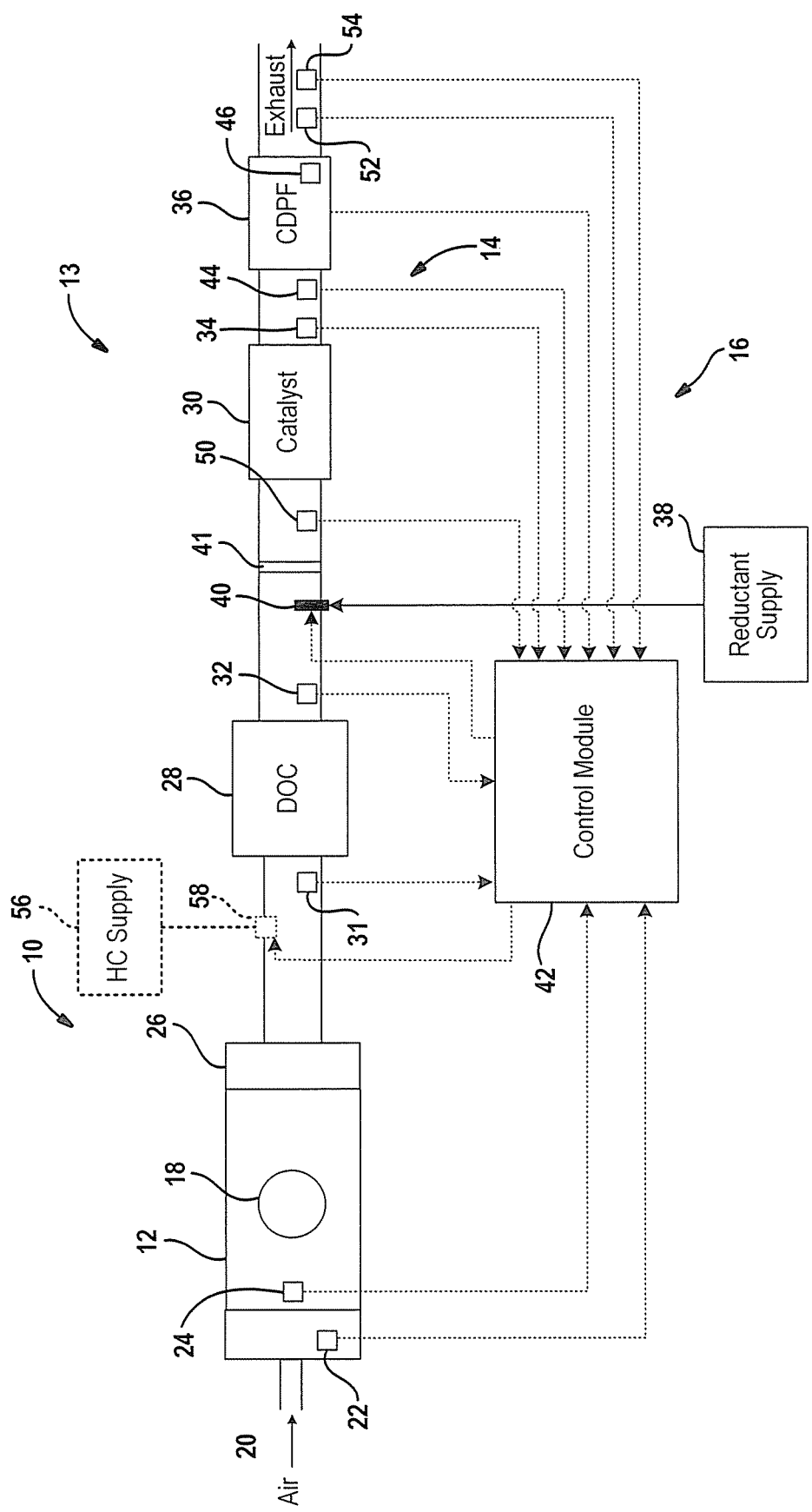
FIG. 1 is a functional block diagram of an engine system including a control module according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or c), using a non-exclusive logical, or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

While the following disclosure involves diesel engines, the present disclosure applies to other types of engines such as gasoline engines.

Some vehicles have a very low exhaust temperature profile under normal driving conditions. These vehicles do not have adequate SCR temperatures for a long enough period of time to reliably perform SCR efficiency testing during normal driving conditions.

As used herein, the term normal unloaded operation refers to operation of the vehicle without towing a trailer and/or substantially loading the vehicle itself. Depending on the weight of the vehicle and drive cycle, some vehicles may have SCR catalyst operating temperatures in a first range. For example only, the first range may be from approximately 130° C. to 220° C. during normal unloaded operation, although other vehicles may have other temperature ranges. In contrast, significantly higher temperatures, for example only a temperature of approximately 500° C., may be encountered when towing a trailer. When testing for SCR efficiency, the SCR catalyst should have a temperature in a second range. The second range is higher than the first range. For example, the second range may be from approximately 250° C. to 450° C., although other vehicles may have other temperature ranges. Thus, when the vehicle is unloaded, the SCR catalyst temperature is lower than the desired SCR testing temperature range. Likewise when towing a trailer, the SCR catalyst temperature may be higher than the desired SCR testing temperature range. Furthermore, even if the SCR temperature is in the proper range when the vehicle tows a trailer, the SCR testing may need to be performed more frequently. The SCR catalyst operating temperature selected for testing may vary depending upon the particular type of SCR catalyst that is used.

SCR catalyst efficiency is typically tested periodically. For example, SCR catalyst efficiency may be tested once per trip. According to the present disclosure, an SCR efficiency testing module interfaces with an exhaust gas temperature management module to increase the SCR temperature to a predetermined temperature range. More particularly, the exhaust gas temperature management module increases the SCR temperature during a period that the SCR efficiency testing module determines the SCR efficiency. When the SCR efficiency testing module finishes, the exhaust gas temperature management module returns to normal control and ends intrusive exhaust gas temperature management.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the diesel engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before the exhaust gas is released to atmosphere. The exhaust system 14 includes an exhaust manifold 26 and a diesel oxidation catalyst (DOC) 28. The exhaust manifold 26 directs exhaust exiting the cylinder through the DOC 28. The exhaust is treated by the DOC 28 to reduce the emissions. The exhaust system 14 further includes an SCR catalyst 30, a temperature sensor 31, an inlet temperature sensor 32, an outlet temperature sensor 34, and a particulate filter (PF) 36.

The temperature sensor 31 may be positioned between the engine and the DOC 18. The inlet temperature sensor 32 is located upstream from the SCR catalyst 30 to monitor the temperature change at the inlet of the SCR catalyst 30, as discussed further below. The outlet temperature sensor 34 is located downstream from the SCR catalyst 30 to monitor the temperature at the outlet of the SCR catalyst 30. Although the exhaust treatment system 13 is illustrated as including the inlet and outlet temperature sensors 32, 34 arranged outside the SCR catalyst 30, the inlet and outlet temperature sensors 32, 34 can be located inside the SCR catalyst 30 to monitor the temperature change of the exhaust at the inlet and outlet of the SCR catalyst 30. The PF 36 further reduces emissions by trapping particulates (i.e., soot) in the exhaust gas.

The dosing system 16 includes a dosing injector 40 that injects reductant from a reductant fluid supply 38 into the exhaust. The reductant mixes with the exhaust and further reduces the emissions when the mixture is exposed to the SCR catalyst 30. A mixer 41 may be used to mix the reductant with the exhaust gas upstream from the SCR catalyst 30. A control module 42 regulates and controls the operation of the engine system 10.

An exhaust gas flow rate sensor 44 may generate a signal corresponding to the flow of exhaust gas in the exhaust system. Although the sensor is illustrated between the SCR catalyst 30 and the PF 36, various other locations within the exhaust system may be used for measurement including after the exhaust manifold and before the SCR catalyst 30.

A temperature sensor 46 generates a particulate filter temperature corresponding to a measured particulate filter temperature. The temperature sensor 46 may be disposed on or within the PF 36. The temperature sensor 46 may also be located upstream or downstream from the PF 36.

Other sensors in the exhaust system may include an upstream NOx sensor 50 that generates a NOx signal based on NOx in the exhaust system. A downstream NOx sensor 52 may be positioned downstream from the PF 36 to measure NOx leaving the PF 36. In addition, an ammonia ($NH_3$) sensor 54 generates a signal corresponding to the amount of ammonia within the exhaust gas. The $NH_3$ sensor 54 is optional, but can be used to simplify the control system due to the ability to discern between NOx and $NH_3$. Alternately and/or in addition, a hydrocarbon (HC) supply 56 and a HC injector 58 may be provided to supply HC in the exhaust gas upstream from the DOC to generate an exothermic reaction and produce heat, which will increase the temperature of the SCR catalyst 30.

Figure 2:
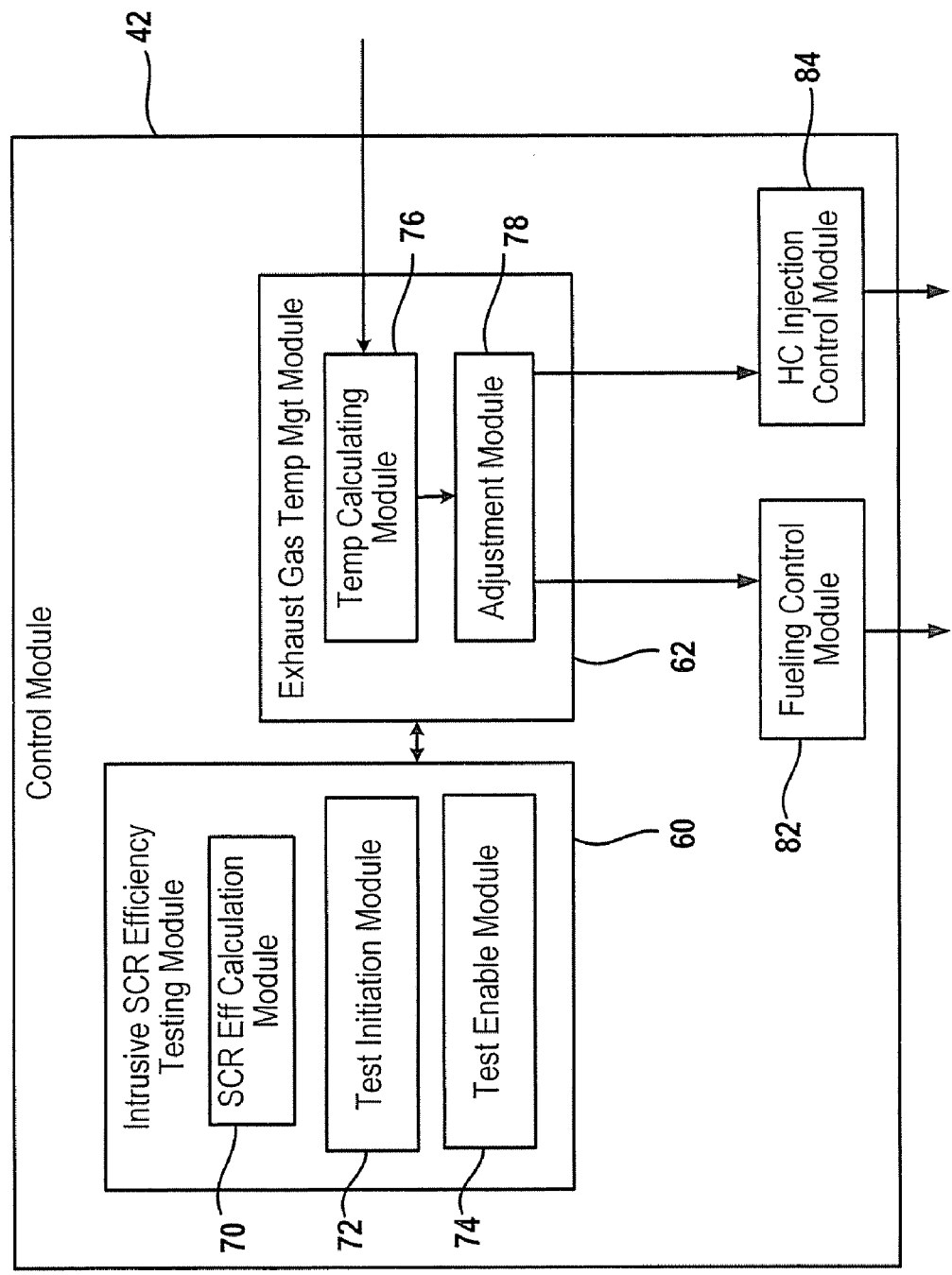
FIG. 2 is a functional block diagram of an exemplary implementation of the control module including an SCR efficiency testing module and an exhaust gas temperature management module according to the present disclosure.

Referring now to FIG. 2, an exemplary implementation of the control module 42 is shown in further detail. The control module 42 includes an SCR efficiency testing module 60 and an exhaust gas temperature management module 62.

The SCR efficiency testing module 60 includes an SCR efficiency calculating module 70, a test initiation module 72 and a test enabling module 74. The SCR efficiency calculating module 70 calculates the SCR efficiency. The test initiation module 72 determines whether or not a test needs to be run. For example, the test may be run every drive cycle, once per trip, etc. The test enabling module 74 determines whether operating conditions are acceptable before initiating the SCR efficiency test.

The exhaust gas temperature management module 62 includes a temperature calculating module 76 and an adjustment module 78. The temperature calculating module 76 receives the inlet and/or outlet SCR temperatures and generates an SCR temperature based thereon. For example, averaging or weighted averaging of the inlet and outlet temperatures may be used. The adjustment module 78 alters an operating parameter of the engine to adjust a temperature of the SCR catalyst 30. For example, the exhaust temperature can be increased by adjusting fuel quantity, fuel injection timing, post injection, HCl injection, etc. In the example set forth above, the A/F ratio is increased or HC fuel is injected into the exhaust stream before the DOC to increase the temperature of the SCR catalyst 30. Fueling can be adjusted via a fuel control module 82 and/or HC fuel can be injected into the exhaust gas using the HC injector 58 via an HC injection control module 84.

Figure 3:
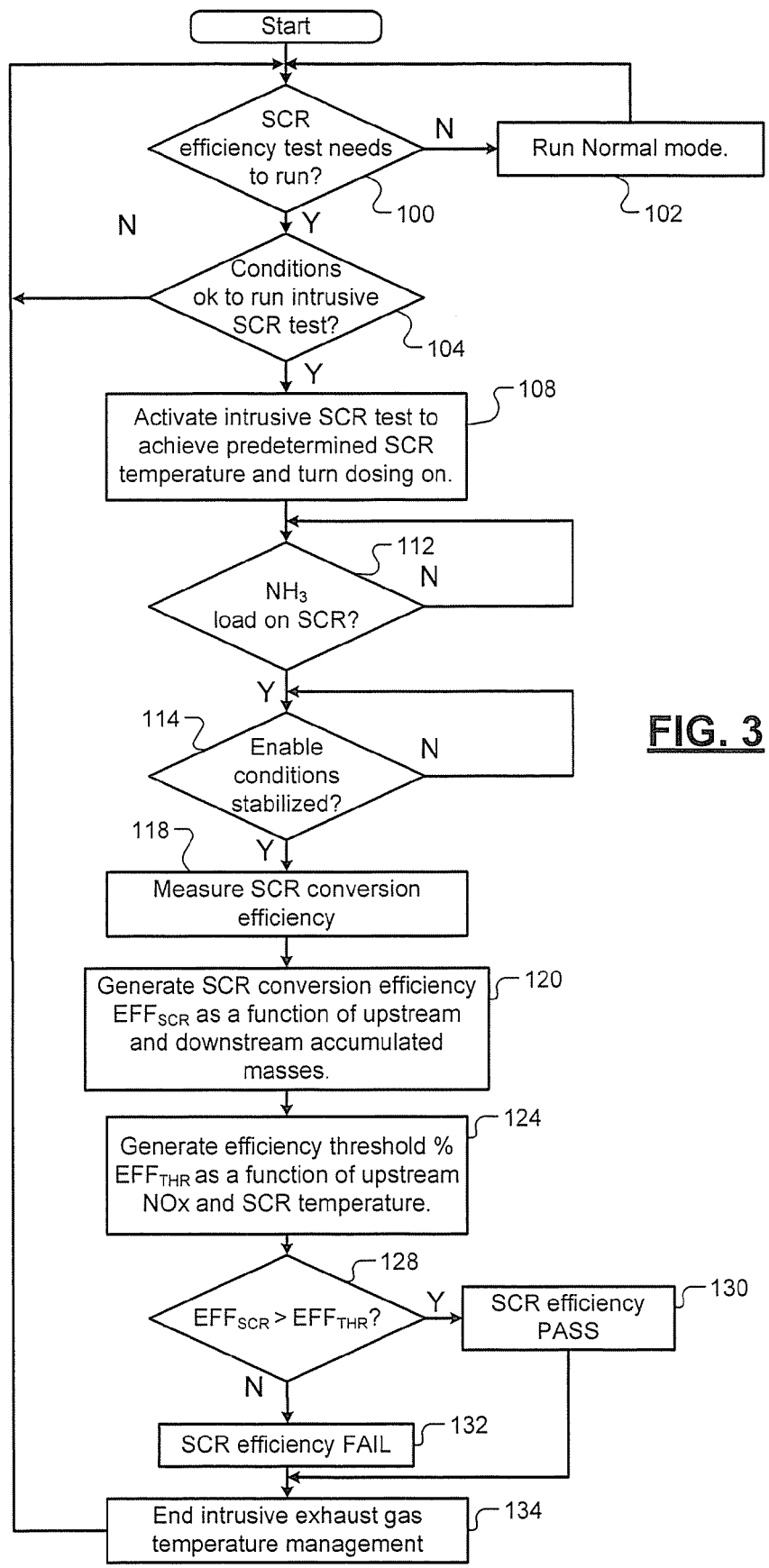
FIG. 3 illustrates a method for performing an intrusive SCR efficiency test according to the present disclosure.

Referring now to FIG. 3, control begins at 100 where control determines whether the SCR efficiency test needs to run. If not, control runs in a normal mode at 102. If 100 is true, control continues at 104 and determines whether a first set of conditions are acceptable to run the SCR efficiency test. For example only, the first set of conditions may include whether or not regeneration of the PF 36 is being performed. PF regeneration is typically performed when soot builds up in the PF 36. Additionally, the first set of conditions may include whether or not adaptation is being performed. Adaptation occurs when there is a problem with the SCR catalyst such that the downstream NOx sensor measurements vary from a model by a predetermined amount. Still other conditions may be included in the first set of conditions instead of or in addition to these conditions.

If 104 is false, control returns to 100. If 104 is true, control activates an intrusive SCR test to achieve a predetermined SCR temperature range. Control also turns dosing on if it is not already on at 108. If the SCR temperature is too low, then the SCR temperature may need to be increased before dosing can be turned on. The SCR temperature at the initiation of the SCR intrusive test may vary. At 112, control determines whether there is a sufficient $NH_3$ load on the SCR catalyst 30. A time delay may be used to ensure that a sufficient $NH_3$ load has been re-established to provide acceptable NOx conversion.

If 112 is false, control waits until there is a sufficient $NH_3$ load on the SCR. At 114, control determines whether a second set of enable conditions have been met. For example only, the second set of enable conditions may include one or more of the following conditions: exhaust flow within a predetermined range; upstream NOx mass flow within a predetermined range; upstream NOx concentration within a predetermined range and/or NOx sensors ready. Still other conditions may be included in the second set of enable conditions in addition to or instead of these conditions.

At 118, control measures the SCR conversion efficiency $EFF_{SCR}$. At 120, control generates SCR conversion efficiency $EFF_{SCR}$ as a function of upstream and downstream accumulated masses. At 124, control generates an efficiency threshold $EFF_{THR}$ as a function of upstream NOx and SCR temperature. The SCR conversion efficiency threshold $EFF_{THR}$ may be a percentage.

At 128, control determines whether $EFF_{SCR} > EFF_{THR}$. If 128 is true, control declares an SCR efficiency PASS status at 130. If 128 is false, control declares an SCR efficiency FAIL status at 132. Control continues from 130 and 132 with 134 where control ends intrusive exhaust gas temperature management.

Figure 4:
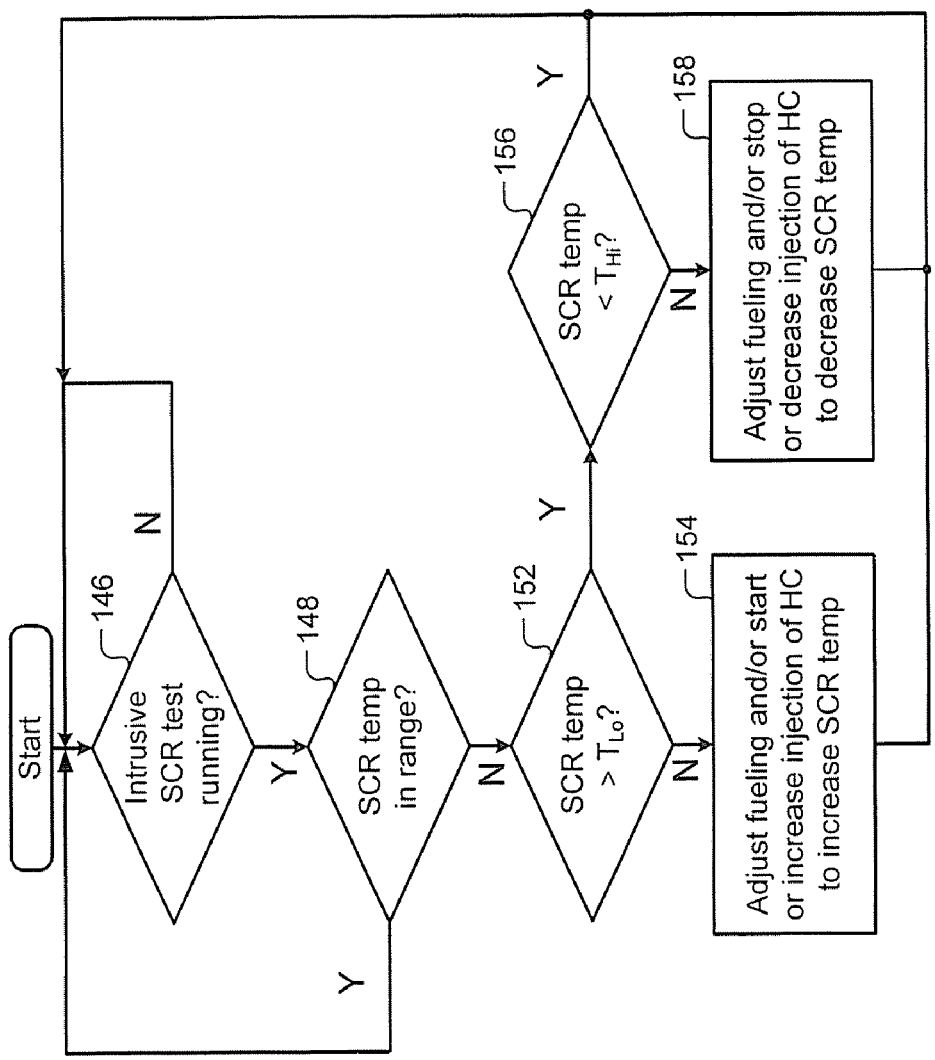
FIG. 4 illustrates a method for increasing a temperature of the SCR catalyst to a predetermined range during the intrusive SCR efficiency test.

Referring now to FIG. 4, steps for performing intrusive exhaust gas temperature management is shown. At 146, control determines whether the intrusive SCR test is running. If 146 is false, control returns to 146. If 146 is true, control continues at 148 where control determines whether the SCR temperature is within a predetermined temperature range (for example, $T_{Lo}$ and $T_{Hi}$).

If 148 is true, control returns to 146. If 148 is false, control determines whether the SCR temperature is greater than $T_{Lo}$ at 152. If 152 is false, control increases the exhaust temperature in any suitable manner. For example, the exhaust temperature can be increased by altering fueling (fuel quantity, fuel injection timing, post injection, etc.) and/or by starting or increasing HC injection at 154. Control returns to 146.

If 148 is false, control determines whether the SCR temperature is less than $T_{Hi}$ at 156. If 156 is false, control decreases the exhaust temperature in any suitable manner. For example, the exhaust temperature can be decreased by altering fueling (fuel quantity, fuel injection timing, post injection, etc.) and/or by stopping or decreasing HC injection at 158. Control returns to 146.

By intrusively controlling the temperature of the SCR, the accuracy of SCR efficiency measurements can be improved. Use of the approach described above will tend to reduce warranty costs relative to systems and methods that diagnose SCR catalyst at very low SCR temperatures where the efficiency is low due to temperature. These conditions also look like an SCR catalyst with poor efficiency. In these low temperature regions, it can be very difficult to differentiate between an operable SCR and a non-operable SCR.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system, comprising:
   a selective catalytic reduction (SCR) catalyst that operates at a first temperature range during unloaded operation of a vehicle;
   an exhaust gas temperature management module that selectively increases a temperature of the SCR catalyst to a predetermined testing temperature range using intrusive exhaust gas temperature management during unloaded operation of the vehicle,
   wherein the predetermined testing temperature range corresponds to loaded operation of the vehicle, and wherein the first temperature range is lower than and distinct from the predetermined testing temperature range; and
   an SCR efficiency testing module that estimates an efficiency of the SCR catalyst during unloaded operation of the vehicle while the temperature is within the predetermined testing temperature range,
   wherein after testing of the efficiency of the SCR catalyst, the exhaust gas temperature management module ends the intrusive exhaust gas temperature management and the temperature of the SCR catalyst returns to the first temperature range.

2. The system of claim 1, wherein the exhaust gas temperature management module alters at least one of fuel quantity, fuel injection timing, and post injection to increase the temperature of the SCR catalyst to the predetermined testing temperature range.

3. The system of claim 1, further comprising a hydrocarbon (HC) fuel injector, wherein the exhaust gas temperature management module injects HC fuel into the exhaust gas using the HC fuel injector upstream from an oxidation catalyst to increase the temperature of the SCR catalyst to the predetermined testing temperature range.

4. The system of claim 1, wherein
the SCR efficiency testing module includes a test enable module that selectively enables testing of the SCR efficiency when particulate filter regeneration is not being performed.

5. The system of claim 1, wherein the SCR efficiency testing module includes a test enable module that selectively enables testing of the SCR efficiency when adaptation control of the SCR catalyst is not being performed.

6. The system of claim 1, further comprising:
an inlet temperature sensor that senses an inlet temperature of the SCR catalyst;
an outlet temperature sensor that senses an outlet temperature of the SCR catalyst; and
wherein the temperature of the SCR catalyst is calculated based on the inlet and outlet temperatures.

7. The system of claim 1, wherein the exhaust gas temperature management module includes:
a temperature calculating module that calculates the temperature of the SCR catalyst based on inlet and outlet temperatures of the SCR catalyst; and
an adjustment module that alters an engine operating parameter to increase a temperature of the SCR catalyst.

8. The system of claim 1, wherein the vehicle is not substantially loaded and is not towing another vehicle during unloaded operation of the vehicle and wherein at least one of the vehicle is substantially loaded and is towing the another vehicle during loaded operation of the vehicle.

9. A method comprising:
operating a selective catalytic reduction (SCR) catalyst at a first temperature range during unloaded operation during of a vehicle;
selectively increasing a temperature of the SCR catalyst to a predetermined testing temperature range using an intrusive exhaust gas temperature management approach during unloaded operation of the vehicle,
wherein the predetermined testing temperature range corresponds to loaded operation of the vehicle, and wherein the first temperature range is lower than and distinct from the predetermined testing temperature range; and
estimating an efficiency of the SCR catalyst during unloaded operation of the vehicle while the temperature is within the predetermined testing temperature range,
wherein after testing of the efficiency of the SCR catalyst, the intrusive exhaust gas temperature management ends and the temperature of the SCR catalyst returns to the first temperature range.

10. The method of claim 9, further comprising altering at least one of fuel quantity, fuel injection timing, and post injection to increase the temperature of the SCR catalyst to the predetermined testing temperature range.

11. The method of claim 9, further comprising injecting hydrocarbon (HC) fuel into the exhaust gas to increase the temperature of the SCR catalyst to the predetermined testing temperature range.

12. The method of claim 9, further comprising selectively enabling testing of the SCR efficiency when particulate filter regeneration is not being performed.

13. The method of claim 9, further comprising selectively enabling testing of the SCR efficiency when adaptation control of the SCR catalyst is not being performed.

14. The method of claim 9, further comprising:
sensing an inlet temperature of the SCR catalyst;
sensing an outlet temperature of the SCR catalyst; and
calculating the temperature of the SCR catalyst based on the inlet and outlet temperatures.

15. The method of claim 9, further comprising:
calculating the temperature of the SCR catalyst based on inlet and outlet temperatures of the SCR catalyst; and
altering an engine operating parameter to increase the temperature of the SCR catalyst.

16. The method of claim 9, wherein the vehicle is not substantially loaded and is not towing another vehicle during unloaded operation of the vehicle and wherein at least one of the vehicle is substantially loaded and is towing the another vehicle during loaded operation of the vehicle.

\* \* \* \* \*